US009178837B2

(12) United States Patent  
Mishra et al.

(10) Patent No.: US 9,178,837 B2
(45) Date of Patent: Nov. 3, 2015

(54) SYSTEM AND METHOD FOR LAYER-2 NETWORK ROUTING

(75) Inventors: Chandan Mishra, Sunnyvale, CA (US); Vaibhav Ashok Modi, San Jose, CA (US); Gayatri Ramachandran, Sunnyvale, CA (US); Sanjay Sane, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/551,350

(22) Filed: Jul. 17, 2012

(65) Prior Publication Data

US 2014/0023074 A1  Jan. 23, 2014

(51) Int. Cl.
   *H04L 12/46* (2006.01)
   *H04L 12/931* (2013.01)
   *H04L 12/721* (2013.01)

(52) U.S. Cl.
   CPC ............ *H04L 49/35* (2013.01); *H04L 12/4641* (2013.01); *H04L 45/66* (2013.01)

(58) Field of Classification Search
   CPC ... H04L 12/18; H04L 12/185; H04L 12/4641; H04L 45/66; H04L 49/35
   USPC .......................................... 370/358, 360, 390
   See application file for complete search history.

(56) References Cited

U.S. PATENT DOCUMENTS

| | | | |
|---|---|---|---|
| 5,903,559 A | 5/1999 | Acharya et al. | |
| 6,002,689 A | 12/1999 | Christie et al. | |
| 6,047,331 A | 4/2000 | Medard et al. | |
| 6,266,705 B1 | 7/2001 | Ullum | |
| 6,477,515 B1 | 11/2002 | Boroujerdi et al. | |
| 6,728,205 B1 | 4/2004 | Finn et al. | |
| 6,934,292 B1 | 8/2005 | Ammitzboell | |
| 7,002,955 B1 * | 2/2006 | Kanuri et al. | 370/389 |
| 7,203,187 B1 | 4/2007 | Richardson et al. | |
| 7,266,635 B1 | 9/2007 | Medina | |
| 7,346,025 B2 | 3/2008 | Bryson | |
| 7,512,226 B1 | 3/2009 | Yoakum et al. | |
| 7,760,668 B1 | 7/2010 | Zinjuvadia | |
| 7,760,735 B1 | 7/2010 | Chen et al. | |
| 7,876,706 B2 | 1/2011 | Ekl et al. | |
| 7,924,702 B2 | 4/2011 | Kulkarmi et al. | |
| 7,940,661 B2 | 5/2011 | Ervin et al. | |

(Continued)

FOREIGN PATENT DOCUMENTS

| | | |
|---|---|---|
| EP | 0361649 A2 | 7/1999 |
| WO | WO 2009088856 A1 * | 7/2009 |
| WO | WO2013/184236 | 12/2013 |

OTHER PUBLICATIONS

USPTO Apr. 18, 2013 Non-Final Office Action from U.S. Appl. No. 12/771,853.

(Continued)

*Primary Examiner* — Melvin Marcelo
*Assistant Examiner* — Natali N Pascual Peguero
(74) *Attorney, Agent, or Firm* — Patent Capital Group (57) ABSTRACT

An example method is provided and includes receiving a data message from a first virtual local area network; determining at an edge switch-router of a Layer-2 network whether the message should be routed; and routing the message in the Layer-2 network at the edge switch-router if the message should be routed. The method also includes switching the message at the edge switch-router if the message should not be routed.

20 Claims, 6 Drawing Sheets

(56) References Cited

U.S. PATENT DOCUMENTS

| | | | |
|---|---|---|---|
| 8,069,304 | B2 | 11/2011 | Panchalingam et al. |
| 8,514,746 | B1 | 8/2013 | Goli et al. |
| 8,594,085 | B2 * | 11/2013 | Zuk et al. ............ 370/389 |
| 8,605,727 | B1 | 12/2013 | Bishara |
| 8,792,374 | B1 | 7/2014 | Jain et al. |
| 2003/0041150 | A1 | 2/2003 | Passman et al. |
| 2003/0189942 | A1 | 10/2003 | Sawey |
| 2004/0105440 | A1 * | 6/2004 | Strachan et al. ............ 370/389 |
| 2004/0114570 | A1 | 6/2004 | Vikberg et al. |
| 2005/0129017 | A1 | 6/2005 | Guingo et al. |
| 2005/0190704 | A1 | 9/2005 | Zhang et al. |
| 2005/0210508 | A1 * | 9/2005 | Lau et al. .............. 725/46 |
| 2006/0045068 | A1 | 3/2006 | Wu et al. |
| 2006/0133282 | A1 | 6/2006 | Ramasamy |
| 2007/0086361 | A1 | 4/2007 | Allan et al. |
| 2007/0140131 | A1 | 6/2007 | Malloy et al. |
| 2007/0245034 | A1 | 10/2007 | Retana et al. |
| 2007/0291733 | A1 | 12/2007 | Doran et al. |
| 2008/0025309 | A1 | 1/2008 | Swallow |
| 2008/0240112 | A1 * | 10/2008 | Muqattash et al. ...... 370/395.31 |
| 2008/0270421 | A1 | 10/2008 | Ushiyama |
| 2009/0168768 | A1 | 7/2009 | Chiabaut et al. |
| 2010/0034100 | A1 | 2/2010 | Beyers et al. |
| 2010/0061269 | A1 | 3/2010 | Banerjee et al. |
| 2011/0032936 | A1 | 2/2011 | Ashwood-Smith et al. |
| 2011/0063979 | A1 | 3/2011 | Matthews et al. |
| 2011/0267947 | A1 | 11/2011 | Dhar et al. |
| 2012/0027017 | A1 | 2/2012 | Rai et al. |
| 2012/0131216 | A1 | 5/2012 | Jain et al. |
| 2012/0300782 | A1 | 11/2012 | Farinacci et al. |
| 2013/0071116 | A1 * | 3/2013 | Ong ................. 398/45 |
| 2013/0094357 | A1 | 4/2013 | Sankar et al. |

OTHER PUBLICATIONS

USPTO Jul. 17, 2013 Response to Non-Final Office Action dated Apr. 18, 2013 from U.S. Appl. No. 12/771,853.

USPTO Aug. 16, 2013 Notice of Allowance from U.S. Appl. No. 12/771,853.

USPTO Oct. 8, 2013 Non-Final Office Action from U.S. Appl. No. 13/453,576.

U.S. Appl. No. 13/209,839, filed Aug. 15, 2011, entitled "Proxy FHRP for Anycast Routing Service," Inventors: Rai Smita, et al.

U.S. Appl. No. 13/492,383, filed Jun. 8, 2012, entitled "System and Method for Layer-2 Multicast Multipathing," Inventors: Santosh Rajagopalan, et al.

U.S. Appl. No. 13/453,576, filed Apr. 23, 2012, entitled "System and M Ethod for Selecting a Root Node in a Network Environment," Inventors: Ayan Banerjee, et al.

USPTO Jun. 8, 2012 Non-Final Office Action from U.S. Appl. No. 12/771,853.

USPTO Sep. 7, 2012 Response to Non-Final Office Action dated Jun. 8, 2012 from U.S. Appl. No. 12/771,853.

USPTO Nov. 16, 2012 Non-Final Office Action from U.S. Appl. No. 12/771,853.

USPTO Feb. 9, 2013 Response to Non-Final Office Action dated Nov. 16, 2012 from U.S. Appl. No. 12/771,853.

USPTO May 23, 2014 Non-Final Office Action from U.S. Appl. No. 13/492,383.

PCT Dec. 9, 2013 International Search Report and Written Opinion of the International Searching Authority from International Application No. PCT/US2013/036423.

USPTO Feb. 26, 2014 Final Office Action from U.S. Appl. No. 13/453,576.

"Load Sharing with HSRP," Cisco Systems, Inc., Aug. 10, 2005, 3 pages www.cisco.com/en/US/tech/tk648/tk362/technologies_configuration_example09186a0080094e90.shtml.

USPTO Jan. 27, 2015 Non-Final Office Action from U.S. Appl. No. 13/453,576.

USPTO Mar. 4, 2015 Notice of Allowance from U.S. Appl. No. 13/492,383.

USPTO Nov. 14, 2014 Final Rejection from U.S. Appl. No. 13/492,383.

PCT Dec. 9, 2014 International Preliminary Report on Patentability and Written Opinion of the International Searching Authority from International Application No. PCT/US2013/036423.

USPTO Jul. 30, 2015 Final Office Action from U.S. Appl. No. 13/453,576.

* cited by examiner

SYSTEM AND METHOD FOR LAYER-2 NETWORK ROUTING

TECHNICAL FIELD

This disclosure relates in general to the field of routing and, more particularly, to a system and a method for Layer-2 network routing.

BACKGROUND

Ethernet architectures have grown in complexity in recent years. This is due, at least in part, to diverse technologies that have emerged to accommodate a plethora of end users. For example, Data Center Ethernet (DCE) represents an extension to Classical Ethernet (CE), and it can offer a lower cost, lower latency, high-bandwidth configuration. The forwarding methodology adopted by networks is generally scalable and, further, provides forwarding paths with equal-cost multipathing with support for different forwarding topologies. Layer-2 link state routing protocols can be used in data centers to overcome the drawbacks of the Spanning Tree Protocol (STP). Transparent Interconnect of Lots of Links (TRILL) from the IETF and Fabricpath from Cisco Systems, Inc. of San Jose, Calif. are examples of such Layer-2 link state routing techniques. The link state protocols allow for better use of network resources by calculating shortest path forwarding trees to the nodes in the network. In certain network scenarios, topology information may not be current, accurate, and/or consistent. Optimally managing network topologies presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes receiving a data message from a first virtual local area network; determining at an edge switch-router of a Layer-2 network whether the message should be routed; and routing the message in the Layer-2 network at the edge switch-router if the message should be routed. The method also includes switching the message at the edge switch-router if the message should not be routed. Note that the broad terms 'switching' and 'routing' encompass any activity associated with directing data to a next location in the network.

In more particular embodiments, determining whether the message should be routed comprises examining a destination Media Access Control (MAC) address for the message. In addition, routing the message comprises determining whether the message is to remain in the Layer-2 network and further comprising routing the message in the Layer-2 network if the message is to remain in the Layer-2 network; and routing the message to a Layer-2/Layer-3 network node if the message is not to remain in the Layer-2 network.

Routing the message can include routing the message to a second virtual local area network in the Layer-2 network. Other implementations can include communicating a multicast message to a group based on a virtual local area network (VLAN) multicast tree used by the L2/L3 network node. In addition, routing the message to a Layer-2/Layer-3 network node can include determining whether a time to live indicator adjustment is allowed; and adjusting the time to live indicator if adjustment is allowed.

Example Embodiments

Figure 1:
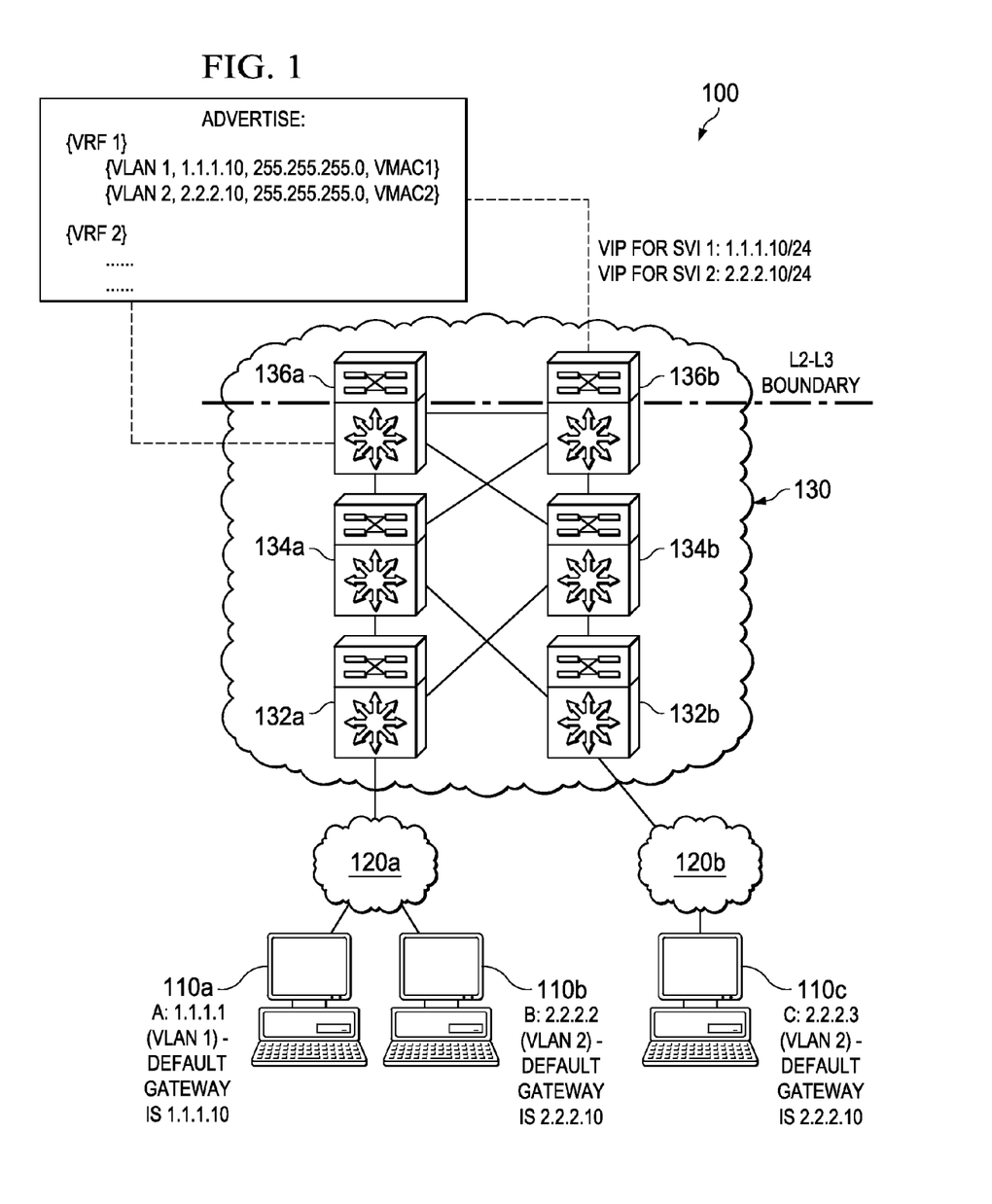
FIG. 1 is a simplified block diagram of an example system for routing in a Layer-2 network in accordance with one embodiment of the present disclosure.

FIG. 1 illustrates an example system 100 for routing in a Layer-2 network in accordance with one embodiment of the present disclosure. System 100 may include a plurality of end nodes 110a-c, a plurality of local area networks (LANs) 120a-b, and a Fabricpath network 130. End nodes 110 may be any logical devices for presenting, storing, and/or processing data. For example, end nodes 110 may be personal computers, laptops, servers, or tablets. End nodes 110 typically seek to communicate data between each other and, thus, they are coupled to one or more communication networks. In certain implementations, one or more of end nodes 110 may be virtual machines. In the illustrated implementation, end node 110a is operating in a first virtual LAN (VLAN), and end nodes 110b-c are in a second VLAN.

Local area networks 120a-b allow end nodes 110 to communicate data with Fabricpath network 130. Local area networks 120a-b may, for example, be Ethernet networks. In the illustrated example, end node 110a and end node 110b are both coupled to local area network 120a, although they are in different VLANs, and end node 110c is coupled to local area network 120b, although it is part of the same VLAN as end node 110b.

Fabricpath network 130, which is an example of one type of Layer-2 multipath (L2MP) network, can be coupled to local area networks 120 and, further, provide routing between end nodes 110. Fabricpath offers a forwarding paradigm that offers a Layer-2 (L2) multipathing capability and the ability to scale L2 networks to a large number of switches and/or routers. In certain implementations, local area networks 120 and Fabricpath network 130 may operate at Layer-2 and form a Layer-2 network. In these situations, each local area network 120 and Fabricpath network 130 may have their own Layer-2 domain. In the illustrated example, Fabricpath network 130 includes two edge switch-routers 132a-b (e.g., one for each local area network 120), two mid-tier switch-routers 134a-b, and two Layer-2/Layer-3 (L2/L3) switch routers 136a-b. Fabricpath network 130 may include different numbers of switch-routers in other implementations. Additionally, mid-tier switch-routers 134a-b may be switches.

Edge switch-routers 132 are configured to receive messages from end nodes 110 (e.g., through local area network 120), and L2/L3 switch-routers 136 are configured to provide a gateway between the Layer 2 network of Fabricpath network 130 and a Layer 3 network (e.g., the Internet). Thus, edge switch-routers 132, at least in this implementation, can include classical Ethernet ports and L2MP ports. The L2/L3 switch-routers also provide inter-VLAN routing (e.g., routing between end node 110a and end node 110b), apart from routing to the Internet. All of the switch-routers can forward (or cooperate with each other in order to forward) messages (e.g., packets) in a network environment by switching and routing messages. Switch-routers 132-136 may be integrated switch-routers, switches that have routing capability, or routers that have switching capability.

Fabricpath network 130 may, for example, be part of an enterprise network or a data center, which could, for example, also include a number of servers, databases, and/or other devices for storing and/or processing data. A data center could also include more communication networks. A communication network is typically a series of points or nodes of interconnected communication paths for receiving and transmitting message. As used herein, the term "network node" is meant to encompass edge switch-routers, switches, routers, gateways, bridges, load balancers, firewalls, inline service nodes, proxies, servers, processors, modules, or any other suitable device, component, element, or object operable to exchange information in a network environment. A network node may include any suitable hardware, software, components, modules, interfaces, or objects that facilitate the operations thereof. This may be inclusive of appropriate algorithms and communication protocols that allow for the effective exchange (reception and/or transmission) of data or information.

A data center's communication network(s) may offer a communicative interface between network nodes (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The networks can support a transmission control protocol (TCP)/IP, or a user datagram protocol (UDP)/IP in particular embodiments of the present disclosure; however, these networks may alternatively implement any other suitable communication protocol for transmitting and receiving data packets within system 100.

Fabricpath network 130 may use a link state routing (e.g., intermediate system to intermediate system (IS-IS) or Fabric Shortest Path First (FSPF)) for forwarding purposes, whereas classic Ethernet networks commonly use a spanning tree protocol (STP) as their forwarding protocol. Link state protocols work at the Layer-2 (L2) broadcast domain. Link state routing is a protocol that allows a node in a network to determine network topology by sharing information about a transmission cost to each of its neighboring nodes. Link state routing messages are transmitted to, and received from, neighbors. The least expensive path to various destinations can be determined using the link state information.

Link state information can be used to generate network topology information at various network nodes for creating forwarding tables. The forwarding tables allow network nodes (such as switches, bridges, and routers) to forward the received traffic on an appropriate output interface. In order to generate a network topology map and a forwarding table at a specific network node, link state information is distributed from various network nodes. Each network node is configured to create a link state message having information about the distance, delay, or cost to each of its neighbors. A link state record (LSR) can then be transmitted to neighboring nodes.

Addressing and forwarding can include the use of a locally assigned aggregatable (or hierarchical) MAC address for forwarding activities. A link state protocol can be used to determine the forwarding topology and, further, to support shortest path and equal cost multi-path forwarding for unicast traffic. Multicast frames can also readily use multi-bathing, albeit using a slightly different scheme. Additionally, a single control protocol can be used to compute unicast paths and multi-destination (e.g., multicast or broadcast) trees. Broadcast techniques can be viewed as a special case of multicast, in which all nodes are interested in a message.

In certain modes of operation, message traffic from end node 110a to end node 110c, which is on another VLAN, may need to be routed and, hence, would need to be switched all the way up to the L2-L3 boundary (i.e., to one of L2/L3 switch-routers 136). At L2/L3 switch-routers 136, the message traffic can be routed and switched back to the destination end node 110b via mid-tier switch-router 134b and edge switch-router 132b. Thus, the traffic should take multiple hops to reach the default gateway, and this may be exacerbated in a Layer-2 multipath (L2MP) such as Fabricpath, as the L2 domain can be large. Moreover, because Fabricpath has the ability to scale Layer-2 networks to a large number of switches, a large number of end nodes could exist in the Layer-2 network. The sub-optimalities present in classical Ethernet could become aggravated in Fabricpath due to the increased scale of the network. One such sub-optimality is intra Layer-2 domain routing.

In some modes of operation, a protocol such as FabricPath ISIS (Intermediate-System to Intermediate System) may be used for L2/L3 switch-routers 136 to provide data regarding the configured switch virtual interfaces (SVIs) to edge switch-routers 132. The data may be pushed down to edge switch-routers 132 and/or or pulled down by the edge switch-routers. For example, if First Hop Redundancy Protocol (FHRP) is being used in Fabricpath network 130, each SVI on L2/L3 switch-routers 136 can have a virtual Media Access Control (MAC) address and a virtual Internet Protocol (IP) address, which may be part of the information provided by L2/L3 switch-routers 136. SVI ports may, for example, share a virtual IP address. Edge switch-routers 132 may then terminate the message traffic destined to any of these virtual MAC addresses. After this, for intra-L2 network traffic, edge switch-routers 132 may perform routing and switching. The SVI VIP mentioned above is a virtual IP address shared by SVI ports of each of the L2-L3 switch-routers 136. VMAC is the corresponding MAC address. The notion of a virtual IP-address is similar to the use of an FHRP virtual-IP, although this scheme does not depend on using FHRP.

Message traffic going outside the L2 network may be handled in various manners at an edge switch-router 132. In certain implementations, message traffic may be switched to an L2-L3 switch router 136. In such implementations, when a message comes in with the destination MAC address of the Layer-2/Layer-3 routers, the edge switch router may try to route the message. However, after looking up its routing information, the edge switch-router may determine that it does not have the capability to route the message (e.g., if the route is assigned an IP address like 20.20.20.20 in the illustrated example). If no match is found, even on a subnet, the default gateway (e.g., 0.0.0.0 in the illustrated example) may be hit. The instructions for the default gateway may indicate (e.g., in one or more fields) to not overwrite the source MAC, the destination MAC, and the VLAN and to not decrement TTL. In addition, part of the instructions may be to perform Layer-2 switching on the message. As a result, the message is Layer-2 switched to the Layer-2/Layer-3 boundary (e.g., no routing is performed) based on the destination MAC address. The routers at the Layer-2/Layer-3 boundary then perform the necessary routing.

In other implementations, message traffic be routed using a special VLAN (termed "transit VLAN" herein) to the L2-L3 boundary, from where it can be routed outside the L2 network. The transit VLAN may be unique across the entire Fabricpath network and used primarily as mentioned here. It can be a hardcoded, reserved VLAN ID, or a value configured by the administrator and subsequently propagated throughout the L2 network. Routing is enabled for the transit VLAN, and it is assigned a MAC address that is made unique and known to the devices in the L2 network. The L2-L3 switch-routers 136 may terminate traffic destined to the transit VLAN MAC address and route it as appropriate. The transit VLAN can also be used for multicast enhancement, which is described below.

For control plane interactions, a protocol such as Fabricpath IS-IS may be used the underlying transport mechanism. Using a control plane protocol, routers at the L2-L3 boundary (i.e., L2/L3 switch-routers 136 in this example), inform edge switch-routers 132 of list of VLANs for which they are acting as a router and the corresponding SVI VIP, subnet addresses, and SVI VMAC. If a transit VLAN is being used, the L2/L3 switch-routers may also inform the edge switch-routers of the transit VLAN ID and its MAC. For example, edge switch-routers 132 may receive a list with entries of the form [VLAN, SVI-VIP, subnet address, SVI-VMAC] from L2/L3 switch-routers 136, and one of those may be a special entry [Transit_VLAN, 0, 0, Transit_MAC]. Edge switch-routers 132 may perform a union operation on the received lists to generate a single list. Then, edge switch-routers 132 may perform the required programming in their forwarding tables to act as the router for each VLAN in the list using the corresponding subnet address. The received SVI-VMACs are programmed as "router MACs" so that traffic destined to these MAC addresses can be terminated and routed at edge switch-routers 132.

In certain implementations, for example, a MAC table can be used for Layer-2 forwarding and a Forwarding Information Base (FIB) can be used for Layer-3 forwarding. For the MAC table, the MAC address can be the key, and the physical port is the value. For the FIB, the IP address/subnet is the key, and the MAC address can be the value. Thus, the programming may install the VMACs in the MAC table and mark them with a special bit called "Gateway MAC" or "GM" bit, which indicates that the message should be routed and, hence, the FIB should be looked up.

Edge switch-routers 132 also perform programming to forward the traffic going outside the L2 network. Edge switch-routers 136 may, for example, be programmed to switch a message if it cannot be routed. Switching the message may for example, be accomplished with a special instruction that indicates that routing should be cancelled and a Layer-2 lookup should be used. As another example, the edge switch-routers may be programmed to use a Transit_MAC using a Transit_VLAN tag. Such traffic would not hit any subnet address in the FIB and can be captured by programming a 0/0 "default gateway" entry, which can point to the transit VLAN's MAC address. SVI-VIP and the corresponding VMAC addresses from the list may be added to the SVI-IP database, which can be used to optimize Address Resolution Protocol (ARP) handling, which can be discussed below.

Subsequently, when message traffic from node 110a (that is to remain within the L2 network) reaches edge switch-router 132a, rather than switching it to an L2-L3 switch router 136 for routing, edge switch-router 132a may route the message traffic and then switch it (e.g., to edge switch-router 132b). Thus, for traffic that needs routing, both the routing and the switching are done at ingress edge switch-router 132. This reduces the number of hops for the traffic since these messages do not have to traverse from an edge switch-router 132 to an L2/L3 switch-router 136 and back. For traffic that just needs switching, such as intra-VLAN traffic (e.g., from end node 110b to end node 110c), operations may proceed as before (e.g., with switching up to the L2/L3 switch routers 136). A detailed example of routing/switching cases can be provided below.

Apart from reducing the number of hops, routing message traffic at edge switch-routers 132 also provides better bandwidth utilization in the L2 network and provides a wider L2 domain (e.g., any-vlan-anywhere advantage provided by Fabricpath). Moreover, the routers at the L2-L3 boundary are then offloaded of the intra-L2 network routing and can perform the routing for messages going in and out of the L2 network more efficiently.

Additionally, the routing optimization may be performed in a completely automated and seamless manner and without performing any routing protocols, such as ISIS or Open Shortest Path First (OSPF), and without adding any new hardware or network design. ARP and multicast behavior may have to be modified to achieve certain enhancements; however, it is not necessary for the enhanced unicast forwarding for inter-VLAN traffic within the same L2 domain.

An alternative approach to this scheme is to configure SVIs on the edge switch-routers. However, there is an administrative overhead since the number of SVIs that need to be configured and maintained on an edge switch-router are proportional to the number of VLANs behind it. The default gateway configuration at end nodes might need to be changed to use the SVI IP addresses at the edge switches. Multiple edge switch-routers can have end nodes in the same VLAN behind them, which implies that for 'E' edge switches with an average of 'V' VLANs behind them, the number of SVIs that might need to be configured can be E*V, which can be a huge waste of IP addresses. Additionally, for routing traffic outside the L2 network, the edge switch-routers need to have their routing tables appropriately programmed to route such traffic to the L2/L3 boundary first. To set these routes up, static routes need to be configured or, more likely, a routing protocol such as Open Shortest Path First (OSPF) should be run. The described scheme, however, may readily work in conjunction with manual SVI configuration on an edge switch-router.

In certain implementations, Access Control List (ACL) and/or Quality of Service (QoS) policies on VLANs may need to be applied when routing occurs at edge switch-routers 132. An automatic download of such policies from L2/L3 switch-routers 136 could be achieved by a unified management solution such as Data Center Network Manager (DCNM) or Cisco Fabric Services (CFS).

The described scheme applies only to routing-capable edge switches (e.g., integrated switch-routers). However, it is should be noted that not every edge device in Fabricpath network 130 is required to participate in the scheme. Thus, if there are some edge devices that are routing capable and others that are not (e.g., switches), the described scheme may be run on the routing-capable devices. The other edge devices can continue to function in the traditional manner and be agnostic of the scheme. If an edge switch-router becomes non-routing capable, it may cease to participate in this scheme (i.e., it should no longer terminate traffic destined to SVI VMAC and no longer reply with the SVI VMAC for any ARP request). Additionally, the scheme described here can be applied even if FHRP is not running.

The scheme can be activated for specific VLANs on specific edge switch-routers. For example, the Gateway MAC (GM) bit may be reset for VMACs corresponding to the VLANs that are excluded. The default may be for all VLANs to be activated. A user can configure an excluded list of VLANs for which the scheme should not be activated. If the optimization is disabled on a particular edge switch-router by the administrator for a particular VLAN, the edge switch-router would not terminate any ARP requests for SVI VIP corresponding to this VLAN. In addition, this edge switch-router would not terminate any traffic destined towards the SVI VMAC corresponding to this VLAN.

On edge switch-routers 132, MAC entries installed because of an ARP reply may have the same timeout value as the ARP timeout value. This is useful because a situation could occur wherein for bidirectional traffic between end nodes that are in different VLANs and behind different edge switch-routers, each edge switch-router can learn the destination end node's MAC through an ARP reply (e.g., data messages can carry a source MAC of the edge switch-router rather than that of the end node). On edge switch-routers 132 that have routing activated, MAC entries should be installed because an ARP reply should have the same timeout value as the ARP timeout. This is useful because a situation could occur wherein for bidirectional traffic between end nodes behind different edge switch-routers, each edge switch-router can learn the destination end node's MAC only through an ARP reply (e.g., data message can carry a source MAC of the edge switch-router rather than that of the end node).

Figure 2:
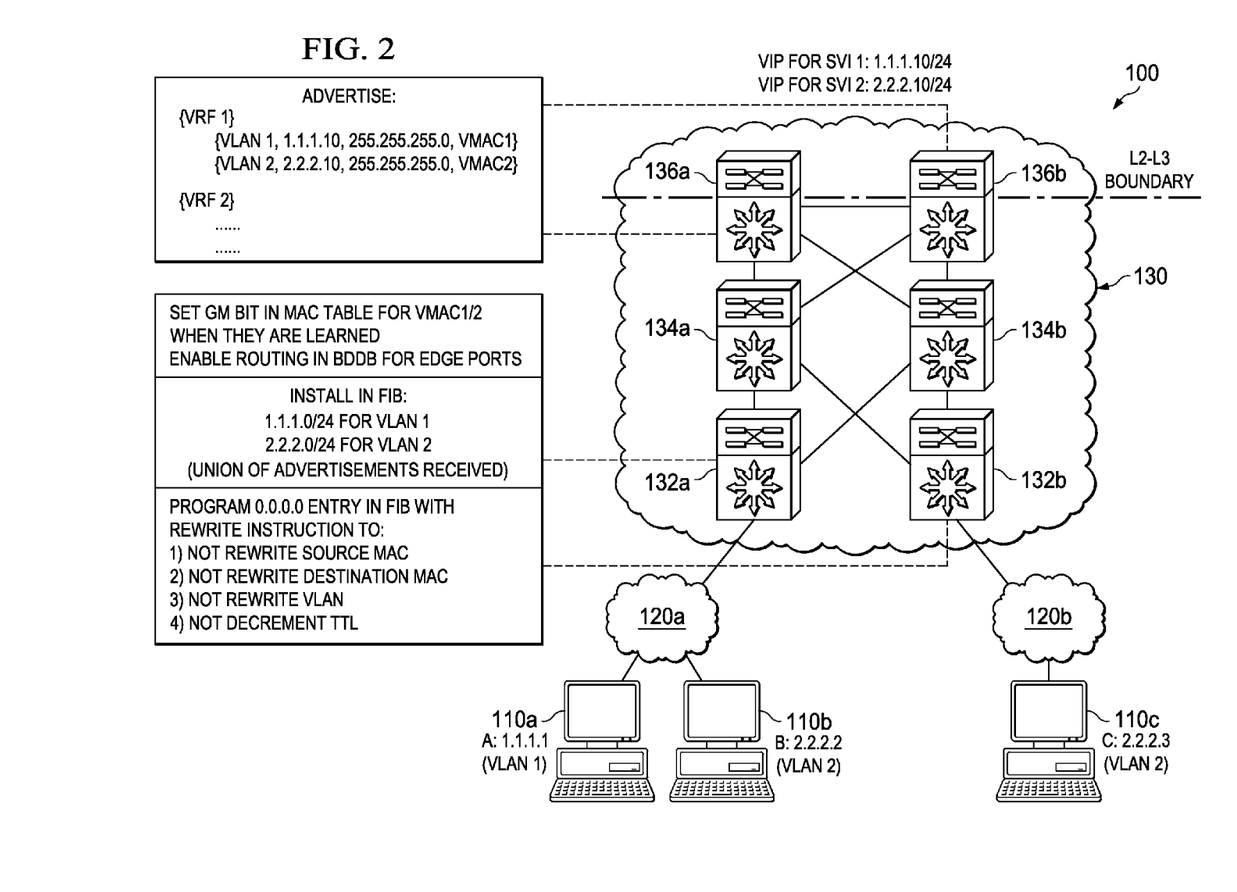
FIG. 2 is a simplified block diagram of an example router programming implementation for the system.

FIG. 2 illustrates example router programming for system 100. In particular, it shows the data that may be obtained from L2/L3 switch-routers 136 and installed in edge switch-routers 132. As before, end node 110a is operating in a first VLAN, and end nodes 110b-c are in a second VLAN. As configured, L2/L3 switch-router 136a is the active router for VLAN 1, and L2/L3 switch-router 136b is active router for VLAN 2. Thus, there are two routers in the L2-L3 boundary with SVIs for the same set.

Using control plane interactions, L2/L3 switch-routers 136 may inform edge switch-routers 132 of: 1) a list of VLANs for which the L2/L3 switch routers are acting as a router and the corresponding SVI VIP, subnet addresses, and SVI VMAC; and 2) a transit VLAN ID and its MAC. For example, edge switch-routers 132 may receive a list with entries of the form {VLAN, SVI-VIP, subnet address, SVI-VMAC} from L2/L3 switch-routers 136, and one of those may be a special entry {Transit_VLAN, 0, 0, Transit_MAC}. Edge switch-routers 132 may perform a union operation on all these lists to generate a single list. Then, edge switch-routers 132 may program their forwarding tables to act as the router for each VLAN in the list using the corresponding subnet address. The received SVI-VMACs are programmed as router MACs so that message traffic destined to these MAC addresses can be terminated and routed at edge switch-routers 132.

In certain implementations, edge switch-routers 132 are also programmed to route the traffic going outside the L2 network to Transit_MAC using Transit_VLAN tag. Such traffic would not hit any subnet address in the forwarding information base (FIB) and can be captured by programming a 0/0 "default gateway" entry. In other implementations, the edge switch-routers are programmed with instructions to switch and not route the message. In such implementations, when a message comes in with the destination MAC address of the Layer-2/Layer-3 routers, the edge switch-router may try to route the message. However, after looking up the routing information, the edge switch-router may determine that it does not have the capability to route the message, and the instructions in the default gateway may be accessed, which may indicate, among other things, to perform Layer-2 switching on the message.

SVI-VIP and the corresponding VMAC addresses from the list may be added to the SVI-IP database, which can be used to optimize Address Resolution Protocol (ARP) handling, which can be discussed below. Node 110a's default gateway is 1.1.1.10 (VIP for SVI 1), and node 110b's default gateway is 2.2.2.10 (VIP for SVI 2). After performing these operations, data traffic may be handled in a different manner in the data plane. For the current discussion, assume that ARP resolution has already occurred. ARP resolution issues and optimizations are discussed below. Fabricpath and CE may form an L2 network.

For unicast traffic destined within the L2 network, edge switch-routers 132 can then intercept any data message ingressing on an edge port and destined to any of the VMACs and switch/route it as appropriate. For example, assume that end node 110a should send a message to end node 110b, which is on the same local area network 120a but in a different VLAN. The message may have a destination IP address of 2.2.2.2, a source IP address of 1.1.1.1, a destination MAC of VMAC1, and a source MAC of node 110a's MAC. The destination MAC is VMAC1 because the source node is in VLAN1. Edge node 110a sends the message into local area network 120a, and the message arrives at edge switch-router 130a. Edge switch-router 130a recognizes VMAC1 as one for which it terminates messages and then routes the message from VLAN1 to VLAN2 and switches it to node 110b. If node 110b's IP address is not present in the FIB, the 2.2.2.0/24 entry in the FIB may be hit, which can trigger a glean process to install node 110b's IP address in the FIB.

As another example, assume that end node 110a seeks to send a message to end node 110c, which is on a different local area network and in a different VLAN. The message may have a destination IP address of 2.2.2.3, a source IP address of 1.1.1.1, a destination MAC of VMAC1, and a source MAC of node 110a's MAC. Edge node 110a sends the message into local area network 120a, and the message arrives at edge switch-router 130a. Edge switch-router 130a again recognizes VMAC1 as one for which it terminates messages then routes the message from VLAN1 to VLAN2 and switches it to node 110c. If node 110c's IP address is not present in the FIB, the 2.2.2.0/24 entry in the FIB may be hit, which would trigger a glean process to install node 110c's IP address in the FIB. The message may then be sent to intermediate switch-router 134b at which it can be switched to edge switch-router 132b and switched to edge node 110c. In certain implementations, the message could be switched directly to edge switch-router 132b, but that depends on the configuration.

As an additional example, assume that end node 110b seeks to send a message to end node 110c, which is on a different local area network but in the same VLAN. The message may have a destination IP address of 2.2.2.3, a source IP address of 2.2.2.2, a destination MAC of node 110c's MAC, and a source MAC of node 110b's MAC. Edge node 110b sends the message into local area network 120a (perhaps after performing an ARP request for node 110c's MAC address, which can be discussed below), and the message arrives at edge switch-router 132a. Edge switch-router 132a does not recognize the destination MAC as one needing routing and, thus, does not route the message. Instead, edge switch-router 132a switches the message to node 110c. The message may then be sent to intermediate switch-router 134b at which it can be switched to edge switch-router 132b and switched to edge node 110c.

Thus, when message traffic from node 110a that is to remain within the L2 network reaches edge switch-router 132a, rather than switching it to an L2-L3 switch router 136 for routing, edge switch-router 132a may route the message traffic and then switch it (e.g., to edge switch-router 132b). Thus, for traffic that needs routing, both routing and the subsequent switching are done at ingress edge switch-router 132. This reduces the number of hops for the traffic since these messages do not have to traverse from an edge switch-router 132 to an L2/L3 switch-router 136 and back. For traffic that just needs switching, operations may proceed as before (e.g., with switching up to the L2/L3 switch routers 136). Apart from reducing the number of hops, this scheme also provides better bandwidth utilization in the L2 network and provides a wider L2 domain. Moreover, the routers at the L2-L3 boundary are then offloaded of the intra-L2 network routing and can perform the routing for messages going in and out of the L2 network more efficiently. Additionally, the routing optimization may be performed in a completely automated and seamless manner and without performing any routing protocols.

Figure 3:
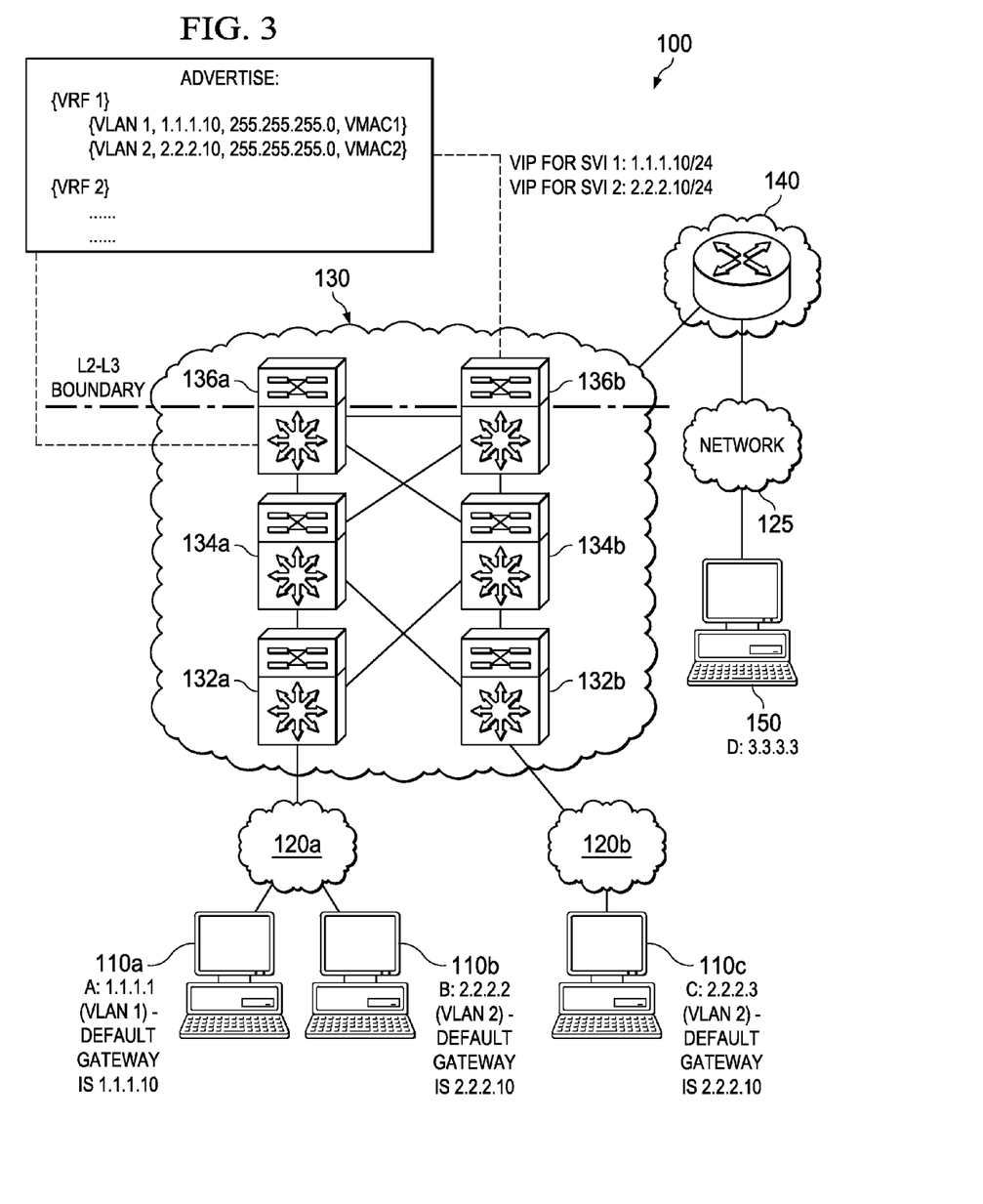
FIG. 3 is a simplified block diagram of an example embodiment of the system of FIG. 1.

FIG. 3 illustrates an example operational scenario for system 100. As before, end node 110a is operating in a first VLAN, and end nodes 110b-c are in a second VLAN. As configured, L2/L3 switch-router 136a is the active router for VLAN 1, and L2/L3 switch-router 136b is the active router for VLAN 2 and for VLAN 3. Thus, there are two routers in the L2-L3 boundary with SVIs for the same set. System 100 is coupled to a communication network 140, which provides access to another end node 150 via a network 125.

In general, communication network 140 provides communication between Fabricpath network 130 and remote computer systems (e.g., data centers, enterprise networks, servers, personal computers, etc.). Communication network 140 may, for example, include a number of switches, routers, bridges, repeaters, and/or other equipment for conveying information. Communication network 140 may, for example, be a wide area network (WAN) or the Internet. In particular implementations, communication network 140 may interconnect data centers and be a data center interconnect (DCI).

Assume, for instance, that node 110a (or node 110b) should send a message to end node 150, which is outside the L2 network. The message may have a destination IP address of 3.3.3.3, a source IP address of 1.1.1.1, a destination MAC address of VMAC1, and a source MAC address of node 110a's MAC address. Edge node 110a sends the message into local area network 120a, and the message arrives at edge switch-router 132a.

In certain modes of operation, since the destination IP address for this traffic is not part of any of the subnets corresponding to SVIs on the L2-L3 boundary, the default gateway entry in the FIB can be hit that points to the transit MAC address. The paths to reach the different L2/L3 switch-routers 136 are programmed as equal cost multipaths to reach the transit MAC address. Thus, the traffic is switched from edge switch-router 132a to L2/L3 switch-router 136a or L2/L3 switch-router 136b on VMAC1 depending on the flow hash. The VLAN tag carried on the traffic sent to the L2/L3 switch-router 136 is the transit VLAN. Because routing on the transit VLAN has been allowed for the routers, the traffic can be terminated and routed by both L2/L3 switch-routers 136 even if they do not have routing activated for the original VLAN on the message. The message is routed at the receiving L2/L3 switch-router 136 into communication network 140 and delivered to end node 150. A similar process would occur if node 110c should send a message to node 150.

In other modes of operation, message traffic may be switched to an L2-L3 switch router. For example, when a message comes in, an edge switch router may try to route it. However, if no match is found, the default gateway may be hit. The instructions for the default gateway may indicate to not overwrite the source MAC, the destination MAC, and the VLAN, to not decrement the TTL, and switch the message. Switching the message may for example, be accomplished with a special instruction that indicates that the routing should be cancelled and a Layer-2 lookup should be used. Since the destination MAC is not overwritten, the result is that the message is switched to the MAC address of one of the routers at the Layer-2/Layer-3 boundary with the original VLAN tag on it. After this point, the Layer-2/Layer-3 boundary routers may perform the necessary routing to end node 150.

For traffic sent from end node 150 to one of end nodes 110 (e.g., end node 110a), the message flow is not affected by the scheme. Thus, the message is routed to an L2/L3 switch-router 136 by communication network 140. This switch-router then routes the message to VLAN1, and the message is switched to node 110a. For traffic that is sent outside the L2 network from an end node 110, time to live (TTL) may be an issue. Consider, for example, a case where end node 110a is communicating with end node 150, which is outside the L2 network. In that case, the TTL is not decremented at edge switch-router 132a for traffic from end node 150 to end node 110a because edge switch-router 132 does not route in that case. However, the TTL may be decremented at edge switch-router 132a for traffic from end node 110a to end node 150 because edge switch-router 132 performs routing in that case.

In order to ensure symmetry in terms of the TTL and to ensure that any assumptions made by higher level applications do not break due to the disclosed scheme, procedures may be needed to ensure that the TTL is not decremented by edge switch-routers 132 when they route traffic to L2/L3 switch routers 136. Because such traffic always hits the default gateway entry, the entry may be programmed to point to a rewrite instruction to not decrement the TTL. There may be adjustments to the ARP handling techniques for the described scheme. From a functionality standpoint, no changes are needed for ARP resolution. The ARP requests for the default gateway IP addresses from end nodes can be handled by the switch-routers at the L2/L3 boundary as it is done currently (e.g., reply with VMAC corresponding to VIP). Similarly, ARP requests for an end node in the L2 network (e.g., end node 110b) from another end node in the L2 network (e.g., end node 110a) can be handled by the sought after end node 110 (e.g., reply with its own MAC address).

There may, however, be one or more scalability issues with this ARP handling approach. First, the switch-routers at the L2/L3 boundary may need to service a large number of ARP requests (e.g., proportional to the number of end nodes). Additionally, the proposed scheme could potentially increase the ARP traffic because multiple L2-L3 switch-routers could perform routing to the same VLAN and, hence, many of them can perform the glean process for the same end node. Moreover, when the number of L2/L3 switch-routers increases, all of the L2/L3 switch-routers could perform the glean process for the same end node. The L2/L3 switch-routers can also periodically update the adjacencies.

To address these issues, several techniques are possible. For example, ARP handling could be performed at the edge switch-routers. For instance, an ARP request ingressing on an edge port may be terminated by the edge switch-router and blocked from entering the Fabricpath core. If the request is for one of the virtual IP addresses at the L2/L3 boundary, the edge switch-router may send an ARP reply with the corresponding VMAC address (using the SVI IP database). If the ARP request is meant for any other IP address, the edge switch-router may generate an ARP request for that IP request. On receiving a reply from an end node, the originating edge switch-router may reply to the original ARP request. This solution addresses the first issue mentioned above.

For example, assume that a first end node A is in VLAN1 and is behind a first edge switch-router, a second end node B is in VLAN2 and is behind a second edge switch-router, and a third end node C is in VLAN1 and is behind the second switch router. The network including the switch-routers may be similar to that shown in FIG. 1. Additionally, end node A's default gateway IP address is IP1 (the SVI VIP for VLAN 1 at the L2/L3 boundary), and end node B's default gateway IP address is IP2 (SVI VIP for VLAN 2 at the L2/L3 boundary). If end node A should determine the MAC address for the default gateway, it may generate an ARP request with the IP address for the default gateway. The ARP request may be received by the first edge switch-router and terminated. The first edge switch-router may then generate an ARP reply for the first default gateway, identifying VMAC1 address as the MAC address. Thus, the ARP request is not forwarded over the Fabricpath network.

When end node A seeks to send a message to end node B, end node A can generate an ARP request for IP1. When the first edge switch-router receives an ARP request ingressing on an edge port, the ARP request is terminated at the edge switch-router and blocked from entering the Fabricpath core. This way, the ARP request from node A never reaches the L2-L3 boundary and is never flooded in the L2 network. Since the request is for one of the virtual IP addresses at the L2/L3 boundary, the first switch-router looks up the VMAC in the SVI IP database and replies to this ARP request. Thus, the CPU of the routers at L2-L3 boundary is offloaded from ARP resolution. Since ARP entries are proportional to the number of end hosts, not having any ARP entries at any routers at the L2-L3 boundary might save a considerable amount of Ternary Content Addressable Memory (TCAM) entries as well. In addition, since the ARP requests are not being broadcast in the L2 network, there is improvement in the bandwidth utilization in the L2 network.

Presume that node A seeks to talk to node C. Since node C is in the same subnet (VLAN) as node A, node A can generate an ARP request for node C this time. When the first edge switch-router receives this request, the switch-router can again block this request since the switch-router blocks ARP requests coming from an edge port. However, since the request is blocked by the first switch-router, it should ensure that ARP learning works correctly for end node A. Hence, the switch-router generates an ARP request for end node C using its IP address. On receiving end node C's MAC address, the first switch-router replies to the original ARP request from end node A.

A way to address both scalability issues is to use ARP at the edge switch-routers with a Designated ARP Resolver (DAR) node. A DAR node is generally a centralized node that has all the IP/MAC bindings. An edge switch-router wanting a binding may send a unicast message to the DAR node. If the DAR node does not know the binding, it may generate a broadcast ARP request. The DAR scheme may be implemented in software and, thus, be part of a switch-router, switch, or other network node.

Routing at the edge switches might lead to a larger number of ARP requests being generated in the L2 network. For example, assume that a first end node A is in VLAN1 and is behind a first edge switch-router, a second end node B is in VLAN2 and is behind the first edge switch-router, and a third end node C is in VLAN1 and is behind a second switch router. Additionally, end node A's default gateway IP address is IP1 (the SVI VIP for VLAN 1 at the L2-L3 boundary), and end node B's configured default gateway IP address is IP2 (SVI VIP for VLAN 2 at the L2-L3 boundary). In this case, both of the edge switch-routers would perform ARP resolution to obtain the MAC address of end node B (i.e., once for the end node A to end node B traffic and again for the end node C to end node B traffic).

If an edge switch-router receives an ARP request for an SVI IP at the L2/L3 boundary, as described earlier, it can look up the SVI database and send an ARP reply with the corresponding VMAC. This operation is the same as the previous ARP handling scheme. However, when an edge-switch router receives an ARP request for an end node, the switch-router unicasts the request to the DAR switch-router. For example, when the edge switch-routers receives an ARP request from end node A requesting end node C's MAC address, instead of broadcasting this request as in the previous scheme, the edge switch-router unicasts this request to the DAR switch-router.

There may be enhancements to the multicast traffic handling techniques for the L2 multipath domain. From a functionality standpoint, no changes are necessarily needed for handling multicast traffic. However, consider a situation in which end nodes A, B, C, and D are part of a multicast group G, the end nodes are in VLANs 1, 2, 3 and 4, respectively, and end nodes A and B are behind a first edge switch-router and end nodes C and D are behind a second switch-router. With the existing solution for multicast, each L2/L3 switch-router would receive a group join request for group G from end nodes A, B, C, and D on VLANs 1, 2, 3, and 4, respectively. Thus, any message destined to group G would have to be replicated four times (i.e., one for each end node) with VLAN tags 1, 2, 3, and 4. Then, each message would be forwarded on a multicast tree based on the VLAN it carries.

One way to improve multicast traffic for this technique is to use the transit VLAN mentioned earlier. For example, the edge switch-routers can terminate the join requests received on different VLANs for group G and just send a single join request for group G on the transit VLAN. Thus, there would be just the transit VLAN multicast tree on which the L2/L3 switch-routers could send a message destined to group G. Furthermore, when the L2/L3 switch-routers receive a multicast packet destined to an end node, they would just need to replicate it once for each edge switch-router. On receiving a message destined for group G from the L2/L3 switch-routers, the edge switch-routers could replicate it to the different VLANs on which the join request was received for group G and then forward the replicated packets on their respective multicast trees. Thus, using the concept of transit VLAN could significantly improve bandwidth utilization in the L2 network.

Figure 4:
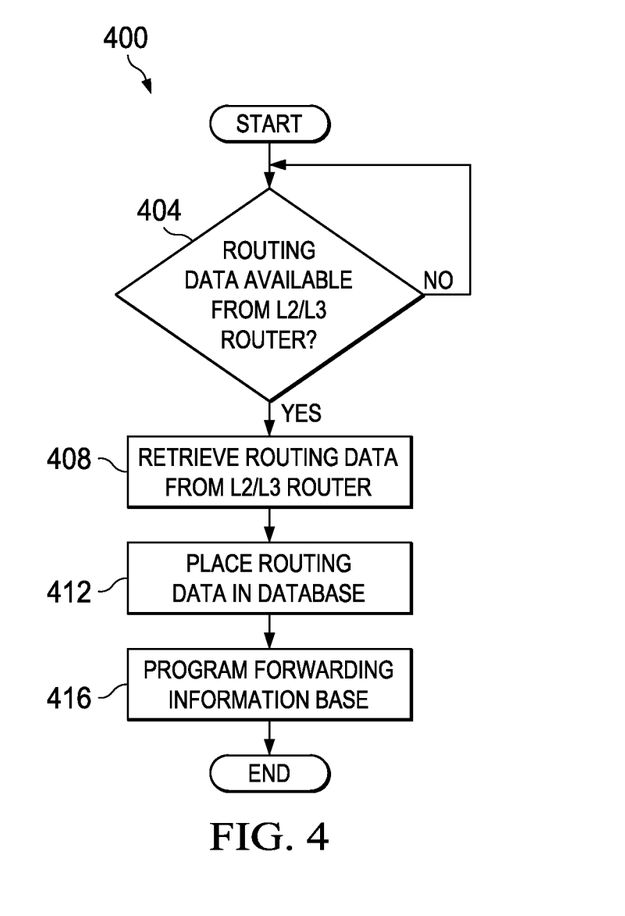
FIG. 4 is a simplified flowchart illustrating an example process for routing in a Layer-2 network in accordance with one embodiment of the present disclosure.

FIG. 4 illustrates an example process 400 for Layer-2 routing in accordance with one embodiment of the present disclosure. Process 400 could, for example, be performed by an edge switch-router 132 in system 100. Process 400 may include determining whether routing data is available from an L2/L3 router (operation 404). For example, an edge switch router could listen to messages from L2/L3 routers to determine whether routing data is available from them. The routing data may, for example, include VIPs and VMACs for SVIs. Process 400 can include retrieving routing data from the L2/L3 router (operation 408). The routing data may, for example, be retrieved using a control plane protocol. Process 400 further includes placing the routing data in a database (operation 412). The database may, for example, be for SVIs and used for ARP processing. Process 400 additionally involves programming the routing data into a forwarding information base (operation 416). The VIPs may, for example, be placed into the forwarding information based.

Figure 5:
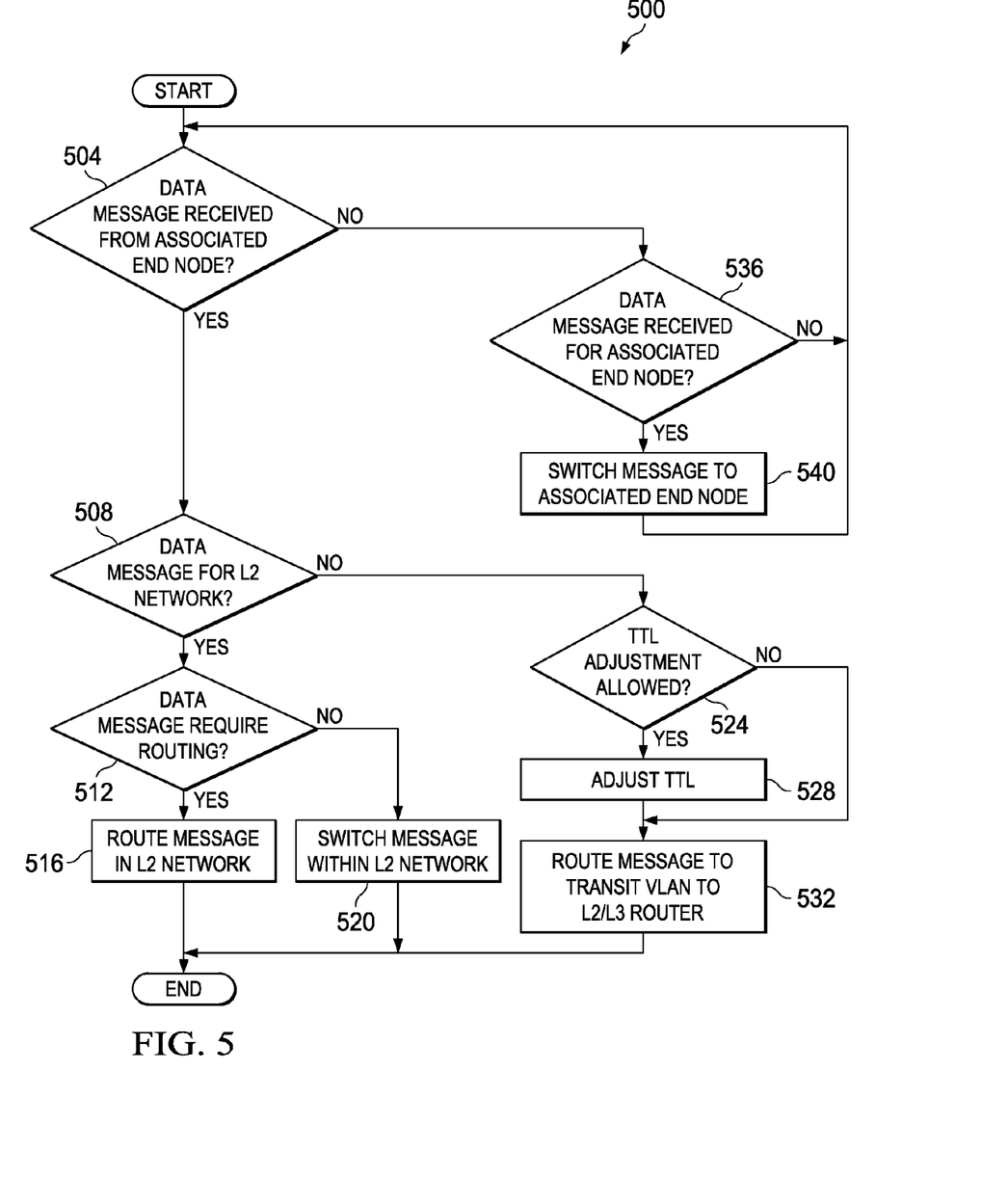
FIG. 5 is a simplified flowchart illustrating an example process for routing in a Layer-2 network in accordance with one embodiment of the present disclosure.

FIG. 5 illustrates an example process 500 for routing in a Layer-2 network in accordance with one embodiment of the present disclosure. Process 500 could, for example, be performed by an edge switch-router 132 in system 100. Process 500 may involve determining whether a data message has been received from an associated end node (operation 504). Determining whether a data message has been received from an associated end node may, for example, be accomplished by determining whether the message ingressed on edge port. If a data message has been received from an associated end node, process 500 may involve determining whether the data message is destined for an L2 network (operation 508). Determining whether the data message is destined for the L2 network may, for example, be accomplished by determining whether the destination IP address for the message is for an allowed subnet.

If the message is destined for the L2 network, process 500 may include determining whether the data message should be routed (operation 512). Determining whether the data message should be routed may, for example, be accomplished by determining whether the destination MAC address for the message has been designated for routing (e.g., in a MAC table). If the message should be routed, process 500 may involve routing the message within the L2 network (operation 516). Routing the message within the L2 network may, for example, include routing the message from a first VLAN to a second VLAN. Process 500 is then at an end. If the message does not require routing, process 500 may involve switching the message within the L2 network (operation 520). A data message may, for example, be switched if it is remaining in the same VLAN. Process 500 is then at an end.

If, however, the message is not destined for the L2 network, process 500 may include determining whether a TTL adjustment is allowed (operation 524). A TTL adjustment may, for example, not be allowed if symmetry should be kept with an end node outside the L2 network. If a TTL adjustment is allowed, process 500 may include adjusting the TTL (operation 528). Once the TTL has been adjusted, or if the TTL adjustment is not allowed, process 500 may include routing the message in a transit VLAN to an L2/L3 router (operation 532).

Returning to operation 504, if a data message has not been received from an associated end node, process 500 may include determining whether a data message has been received for an associated end node (operation 536). A data message may, for example, have been received for an associated end node from an L2/L3 switch-router or an edge switch-router in an L2 network. If a data message has not been received for an end node, process 500 may include again checking for a data message from an associated end node (operation 504). If, however, a data message has been received for an end node, process 500 may involve switching the message to the associated end node (operation 508). Process 500 then again checks for a data message from an associated end node (operation 504).

Although FIG. 5 illustrates one example process for routing in a Layer-2 network, other processes for routing in a Layer-2 network may include fewer, additional, and/or a different arrangement of operations. For example, a process may not include performing a TTL adjustment. As another example, a process may not include determining whether a message is to remain in the L2 network (e.g., if all messages remain in the L2 network). As another example, a process may include switching a message to an L2/L3 router if the message is to be routed outside the L2 network.

Note that with the examples provided herein, interaction may be described in terms of two or three elements. However, this has been done for purposes of clarity and example only. In certain cases, it may be easier to describe one or more of the functionalities of a given set of flows by only referencing a limited number of network nodes. It should be appreciated that the communication systems are readily scalable and can accommodate a large number of clouds, networks, and/or switches, as well as more complicated/sophisticated arrangements and configurations. Accordingly, the examples provided herein should not limit the scope or inhibit the broad teachings of the specification as potentially applied to a myriad of other architectures.

Figure 6:
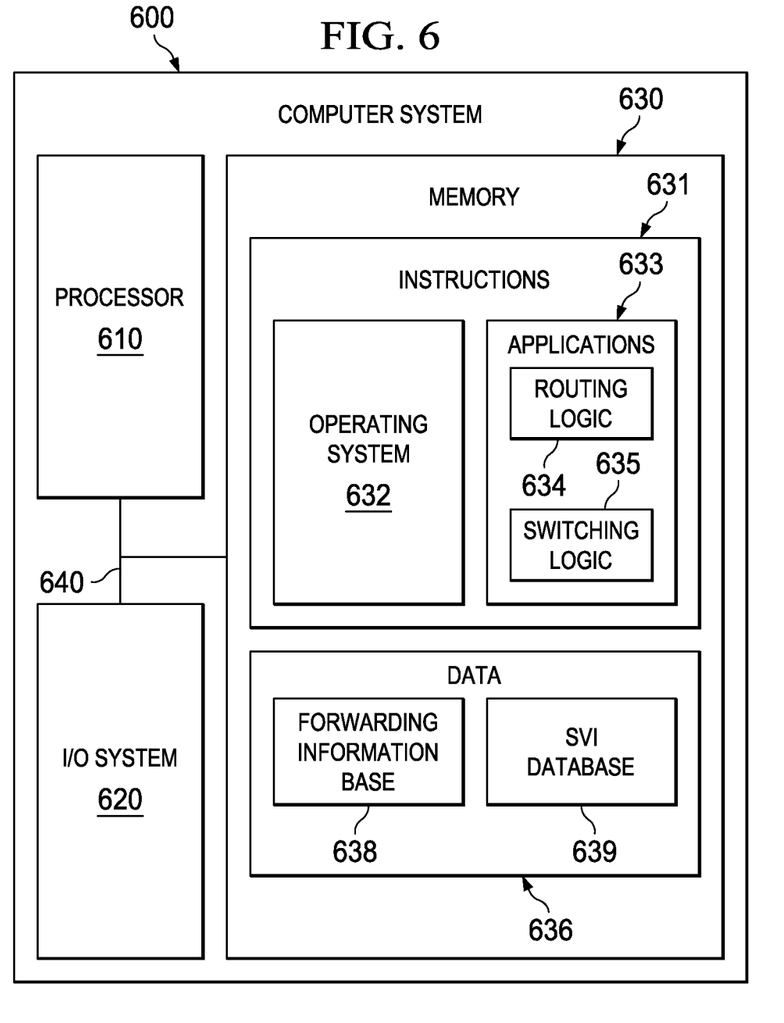
FIG. 6 is a simplified block diagram of an example network node in a Layer-2 network in accordance with one embodiment of the present disclosure.

FIG. 6 illustrates an example computer system 600 for routing in a Layer-2 network. Computer system 600 may, for example, illustrate some of the components of the control plane of a switch/router. System 600 includes a processor 610, an input/output system 620, and memory 630, which are coupled by a link 640. Processor 610 typically includes a logical processing unit (e.g., an arithmetic logic unit) that processes data under the direction of program instructions (e.g., from software). For example, processor 610 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 620 may include one or more communication interfaces and/or one or more other user interfaces. A communication interface may, for instance, be a network interface card (whether wireless or wireless), a modem, or a bus interface. A user interface could, for instance, be a user input device (e.g., a keyboard, a keypad, a touchpad, a stylus, or a microphone) or a user output device (e.g., a monitor, a display, or a speaker). In general, system 620 may be any combination of devices by which a computer system can receive and output data.

Memory 630 may, for example, include random access memory (RAM), read-only memory (ROM), flash memory, and/or disc memory. Various items may be stored in different portions of the memory at various times. Memory 630, in general, may be any combination of devices for storing data. Memory 630 includes instructions 631 and data 636. Instructions 631 include an operating system 632 (e.g., Windows, Linux, or Unix) and applications 633, which include routing logic 634 and switching logic 635. Data 636 includes the data required for and/or produced by applications 633, including a forwarding information database 638 and an SVI database 639. Link 640 is responsible for communicating data between processor 610, input/output system 620, and memory 630. Link 640 may, for example, include a number of different types of busses (e.g., serial and parallel).

In certain modes of operation, processor 610, according to routing logic 634 (or in conjunction with any software), may determine whether a data message has been received from an associated end node. Determining whether a data message has been received from an associated end node may, for example, be accomplished by determining whether the message ingressed on edge port. If a data message has been received from an associated end node, a determination can be made whether the data message should be routed (e.g., determining whether the destination MAC address for the message has been designated for forwarding information database 638).

If the data message should be routed, a determination can be made whether the data message is destined for an L2 network. If the message is destined for the L2 network, the message can be routed within the L2 network. Routing the message within the L2 network may, for example, include routing the message from a first VLAN to a second VLAN. If, however, the message is not destined for the L2 network, the message can be provided (e.g., by switching in the L2 network or routing in a transit VLAN) to an L2/L3 router. The determination can also be made whether a TTL adjustment is allowed. A TTL adjustment may, for example, not be allowed if symmetry should be kept with an end node outside the L2 network. If a TTL adjustment is allowed, the process may include adjusting the TTL.

If the data message does not require routing, the processor may (again, in conjunction with software) switch the message in within the L2 network. A data message may, for example, be switched if it is remaining in the same VLAN. A determination can be made whether a data message has been received for an associated end node. A data message may, for example, have been received for an associated end node from an L2/L3 switch-router or an edge switch-router in the L2 network. If a data message has been received for an end node, the message can be switched to the associated end node.

A determination can also be made whether routing data is available from a L2/L3 router. The routing data may, for example, include VIPs and VMACs for SVIs. The processor (e.g., in conjunction with software) can retrieve routing data from the L2/L3 router (e.g., by using a control plane protocol). The routing data can be placed in SVI database 639, which may, for example, be for SVIs and used for ARP processing. The routing data can also be programmed into a forwarding information base 638. The VIPs may, for example, be placed into the forwarding information based. Processor 610 may, for example, accomplish these operations in conjunction with software, etc. and/or by implementing one or more parts of processes 400-500. Processor 610 may also use any other suitable techniques discussed herein.

As identified previously, a network node can include software (e.g., routing logic, switching logic, etc.) to achieve the L2 optimization operations, as outlined herein in this document. In certain example implementations, the L2 optimization functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [for example, shown in FIG. 6], or other similar machine, etc.). In some of these instances, a memory element [shown in FIG. 6] can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification.

In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network nodes, etc.) can include memory elements for storing information to be used in achieving the L2 optimization activities, as outlined herein. Additionally, each of these devices may include a processor that can execute software or an algorithm to perform the randomization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

It is also important to note that the operations discussed with reference to FIGS. 1-6 illustrate only some of the possible scenarios that may be executed by, or within, a communication system. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is allowable, however, in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, virtually any configuration that seeks to intelligently switch packets could enjoy the benefits of the present disclosure.

Numerous other changes, substitutions, variations, alterations, and modifications may be ascertained to one skilled in the art, and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving, by a first edge switch-router of a Layer-2 network, a data message for a destination end node from a source end node operating behind the first edge switch-router, wherein the end node is in a first virtual local area network (VLAN);
when the destination end node is operating behind a second edge switch-router of the Layer-2 network and the destination end node is in a second VLAN, the first edge switch-router both routing the message from the first VLAN to the second VLAN and switching the message from the source end node to the destination end node, wherein the message is routed and switched without traversing any switch-router that provides a gateway between the Layer-2 network and a Layer-3 network; and
when the destination end node is operating behind the second edge switch-router and the destination end node is in the first VLAN, the first edge switch-router switching the message from the source end node to the destination end node, wherein the message is switched without traversing any switch-router that provides a gateway between the Layer-2 network and the Layer-3 network.

2. The method of claim 1, further including:
when the destination end node is operating behind the first edge switch-router and the destination end node is in the second VLAN, the first edge switch-router both routing the message from the first VLAN to the second VLAN and switching the message from the source end node to the destination end node, wherein the message is routed and switched without traversing any switch-router that provides the gateway between the Layer-2 network and the Layer-3 network.

3. The method of claim 1, further including:
receiving, by the first edge switch-router, routing data from switch-routers that provide gateways between the Layer-2 network and the Layer-3 network, wherein the routing data indicates a first switch virtual interface (SVI) virtual Internet Protocol (VIP) address and a first SVI virtual media access control (VMAC) address associated with the first VLAN and a second SVI VIP address and a second SVI VMAC address associated with the second VLAN;
installing, by the first edge switch-router, a first VMAC address entry and a second VMAC address entry in a MAC table, each with a corresponding indication that the first edge switch-router can route messages destined for the first VMAC address and the second VMAC address; and
installing, by the first edge switch-router, a first VIP address entry and a second VIP address entry in a forwarding information base (FIB) table.

4. The method of claim 3, further including:
determining, by the first edge switch-router, that the message should be routed when a destination MAC address associated with the message corresponds with the first VMAC address or the second VMAC address; and
looking up, by the first edge switch-router, a destination IP address associated with the message in the FIB table upon determining that the message should be routed.

5. The method of claim 4, further including, when the destination IP address is not present in the FIB table, hitting the first VIP address entry or the second VIP address entry to trigger a glean process to install the destination IP address in the FIB table.

6. The method of claim 1, further including:
when the destination end node is outside the Layer-2 network, the first edge switch-router routing the message to a switch-router that provides a gateway between the Layer-2 network and the Layer-3 network.

7. The method of claim 6, wherein the
receiving, by the first edge switch-router, routing data from switch-routers that provide gateways between the Layer-2 network and the Layer-3 network, wherein the routing data indicates a transit VLAN ID used for routing messages to the switch-routers, the transit VLAN ID having an associated transit VLAN media access control (MAC) address;
installing, by the first edge switch-router, a default gateway entry in the FIB table that points to the transit VLAN MAC address; and
switching, by the first edge switch-router, the message to one of the switch-routers upon hitting the default gateway entry.

8. The method of claim 7, wherein installing the default gateway entry includes including an instruction not to decrement a time to live (TTL) indicator.

9. The method of claim 7, further including creating a transit VLAN multicast tree for a group of end nodes using the transit VLAN.

10. An edge switch-router, comprising:
a memory configured to store data; and
a processor operable to execute instructions associated with the data, wherein the processor and the memory cooperate, such that the edge switch-router of a Layer-2 network is configured to:
receive a data message for a destination end node from a source end node operating behind the edge switch-router, wherein the end node is in a first virtual local area network (VLAN);
when the destination end node is operating behind another edge switch-router of the Layer-2 network and the destination end node is in a second VLAN, both route the message from the first VLAN to the second VLAN and switch the message from the source end node to the destination end node, wherein the message is routed and switched without traversing any switch-router that provides a gateway between the Layer-2 network and a Layer-3 network; and
when the destination end node is operating behind the second edge switch-router and the destination end node is in the first VLAN, switch the message from the source end node to the destination end node, wherein the message is switched without traversing any switch-router that provides a gateway between the Layer-2 network and the Layer-3 network.

11. The edge switch-router of claim 10, further configured to:
when the destination end node is operating behind the edge switch-router and the destination end node is in the second VLAN, both route the message from the first VLAN to the second VLAN and switch the message from the source end node to the destination end node, wherein the message is routed and switched without traversing any switch-router that provides the gateway between the Layer-2 network and the Layer-3 network.

12. The edge switch-router of claim 10, wherein the memory includes a media access control (MAC) table and a forwarding information base (FIB) table, the edge switch-router further configured to:
receive routing data from switch-routers that provide gateways between the Layer-2 network and the Layer-3 network, wherein the routing data indicates a first switch virtual interface (SVI) virtual Internet Protocol (VIP) address and a first SVI virtual media access control (VMAC) address associated with the first VLAN and a second SVI VIP address and a second SVI VMAC address associated with the second VLAN;

install a first VMAC address entry and a second VMAC address entry in the MAC table, each with a corresponding indication that the edge switch-router can route messages destined for the first VMAC address and the second VMAC address; and install a first VIP address entry and a second VIP address entry in the FIB table.

13. The edge switch-router of claim 12, further configured to:

determine that the message should be routed when a destination MAC address associated with the message corresponds with the first VMAC address or the second VMAC address; and look up a destination IP address associated with the message in the FIB table upon determining that the message should be routed.

14. The edge switch-router of claim 12, wherein the routing data further indicates a transit VLAN ID used for routing messages to the switch-routers, the transit VLAN ID having an associated transit VLAN media access control (MAC) address, the edge switch-router further configured to:

install a default gateway entry in the FIB table that points to the transit VLAN MAC address; and switch the message to one of the switch-routers upon hitting the default gateway entry.

15. The edge switch-router of claim 10, further configured to terminate join requests received on different VLANs for a group of end nodes and send a single join request for the group using the transit VLAN.

16. A non-transitory media encoded with logic that includes code for execution and when executed by a processor operable to perform operations comprising:

receiving a data message for a destination end node from a source end node operating behind a first edge switch-router of a Layer-2 network, wherein the end node is in a first virtual local area network (VLAN);

when the destination end node is operating behind a second edge switch-router of the Layer-2 network and the destination end node is in a second VLAN, both routing the message from the first VLAN to the second VLAN and switching the message from the source end node to the destination end node, wherein the message is routed and switched without traversing any switch-router that provides a gateway between the Layer-2 network and a Layer-3 network; and when the destination end node is operating behind the second edge switch-router and the destination end node is in the first VLAN, switching the message from the source end node to the destination end node, wherein the message is switched without traversing any switch-router that provides a gateway between the Layer-2 network and the Layer-3 network.

17. The non-transitory media of claim 16, further operable to perform operations including:

when the destination end node is operating behind the first edge switch-router and the destination end node is in the second VLAN, both routing the message from the first VLAN to the second VLAN and switching the message from the source end node to the destination end node, wherein the message is routed and switched without traversing any switch-router that provides the gateway between the Layer-2 network and the Layer-3 network.

18. The non-transitory media of claim 16, further operable to perform operations including:

receiving routing data from switch-routers that provide gateways between the Layer-2 network and the Layer-3 network, wherein the routing data indicates a first switch virtual interface (SVI) virtual Internet Protocol (VIP) address and a first SVI virtual media access control (VMAC) address associated with the first VLAN and a second SVI VIP address and a second SVI VMAC address associated with the second VLAN;

installing a first VMAC address entry and a second VMAC address entry in a MAC table, each with a corresponding indication that the first edge switch-router can route messages destined for the first VMAC address and the second VMAC address; and installing a first VIP address entry and a second VIP address entry in a forwarding information base (FIB) table.

19. The non-transitory media of claim 18, further operable to perform operations including:

determining that the message should be routed when a destination MAC address associated with the message corresponds with the first VMAC address or the second VMAC address; and looking up a destination IP address associated with the message in the FIB table upon determining that the message should be routed.

20. The non-transitory media of claim 18, wherein the routing data further indicates a transit VLAN ID used for routing messages to the switch-routers, the transit VLAN ID having an associated transit VLAN media access control (MAC) address, the non-transitory media further operable to perform operations including:

installing a default gateway entry in the FIB table that points to the transit VLAN MAC address; and switching the message to one of the switch-routers upon hitting the default gateway entry.

* * * * *